United States Patent [19]

Standke et al.

[11] Patent Number: 5,679,147
[45] Date of Patent: Oct. 21, 1997

[54] WATER-BASED ORGANIC POLYSILOXANE-CONTAINING COMPOSITIONS, PROCESSES FOR THEIR PREPARATION AND THEIR USE

[75] Inventors: Burkhard Standke, Loerrach; Christine Fliedner, Bonn; Albert Frings, Rheinfelden; Michael Horn, Rheinfelden; Hans-Joachim Koetzsch, Rheinfelden; Jaroslaw Monkiewicz, Rheinfelden; Hans-Guenther Srebny, Duelmen-Rorup, all of Germany

[73] Assignee: Huels Aktiengesellschaft, Marl, Germany

[21] Appl. No.: 569,900

[22] Filed: Dec. 8, 1995

[30] Foreign Application Priority Data

Dec. 9, 1994 [DE] Germany ............... 44 43 825.7

[51] Int. Cl.$^6$ ................................. C09D 183/08
[52] U.S. Cl. ................................. 106/287.11
[58] Field of Search ........................ 106/287.11

[56] References Cited

U.S. PATENT DOCUMENTS 4,620,878 11/1986 Gee ................... 106/287.15
5,073,195 12/1991 Cuthbert et al. ............ 106/2

FOREIGN PATENT DOCUMENTS 0 358652 3/1990 European Pat. Off. .
0 442098 8/1991 European Pat. Off. .

*Primary Examiner*—David Brunsman
*Attorney, Agent, or Firm*—Oblon, Spivak, McClelland, Maier & Neustadt, P.C.

[57] ABSTRACT

Water-based organopolysiloxane-containing compositions which are essentially free from organic solvents, have a flashpoint above 80° C., and essentially liberate no alcohols by hydrolysis on dilution with water are obtainable by mixing water-soluble aminoalkylalkoxysilanes with alkyltrialkoxysilanes and/or dialkyldialkoxysilanes and/or mixtures of alkyltrialkoxysilanes and dialkyldialkoxysilanes which are not water-soluble, adding water to the mixture, adjusting the pH of the reaction mixture to a value of between 1 and 8 and removing any alcohol already present and/or formed during the reaction. Such compositions are especially useful for hydrophobicizing the surface of building materials such as brick, concrete, lime sand brick, and mortar.

23 Claims, No Drawings

WATER-BASED ORGANIC POLYSILOXANE-CONTAINING COMPOSITIONS, PROCESSES FOR THEIR PREPARATION AND THEIR USE

BACKGROUND OF THE INVENTION

1. Field of the Invention

The present invention relates to water-based organopolysiloxane-containing compositions, a process for their preparation, and their use for hydrophobicizing surfaces, for hydrophobicizing mineral building materials, for protecting buildings and facades, for coating glass fibers, for silanizing fillers, for improving the rheological properties of dispersions and emulsions, for hydrophobicizing textiles, leather and cellulose and starch products, as adhesion promoters for improving the adhesion of organic polymers to inorganic surfaces, as release agents, as crosslinking agents, and as additives for paints and varnishes. The organopolysiloxane-containing compositions according to the present invention are essentially free from solvents. In the context of the present invention, solvent-free compositions are to be understood as meaning those which comprise no aliphatic or aromatic hydrocarbons, halogenohydrocarbons, glycols, glycol ethers, ethers, ketones, esters or amides or other nitrogen compounds or sulphur or nitro compounds on a purely organic basis, as well as proton-free (or hydrogen-free) solvents in contents of more than 10 ppm by weight. On the other hand, proton-containing agents, such as water, inorganic or organic acids and alcohols, such as methanol, ethanol, n- and i-propanol and higher alcohols in this series are not regarded as organic solvents in the context of the present invention.

DISCUSSION OF THE BACKGROUND

Mineral building materials—such as, for example, brick, concrete, lime sand brick and mortar—are usually subjected to weathering. For this reason, protective coats of paint are as a rule applied to the surface to avoid such weathering processes.

Another favorable method to avoid the effects of weathering is impregnation of the surface. With this method, a hydrophobicizing agent penetrates into a porous structure. In addition to protection of the surface, a certain deep action is also achieved. Furthermore, since no vapor-proof layer is formed, the permeability to water vapor usually required is maintained. The deep action is of course limited by the ability of the liquid hydrophobizing agent to penetrate into a porous substance.

Criteria for the quality of the water-repellent action of hydrophobizing agents are in general the "beading effect" after the impregnation, the penetration depth of the hydrophobizing agent in, for example, porous mineral building materials, and reduction in the absorption of water after treatment of the materials with the hydrophobizing solution. In addition, the surface of the materials should not be changed from the original appearance after the impregnation.

Organosilanes of the general formula $R^0$—$Si(OR^1)_3$, where $R^0$ is an organic radical and $R^1$ is a methyl or ethyl radical, have diverse uses, for example as adhesion promoters, release agents, agents for improving rheology, crosslinking agents, and also as hydrophobizing agents.

For ecological, work safety and economic reasons, there is a change more and more to applying them in aqueous form. As a rule, the following problems arise here: alcohols are liberated by hydrolysis:

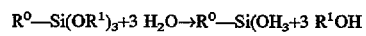

The presence of free alcohols lowers the flashpoint of the solution used, so that explosion-proof machines and special apparatuses for the necessary processing steps must be employed. For toxicological reasons, the employees entrusted with handling such products must be additionally trained and protected. Furthermore, disposal of the spent solution used presents difficulties because of the hydrolysis alcohols. Special waste water clarification plants and plants for after-treatment of waste gas and waste air are required. the organosilane to be applied in water is not water-soluble:

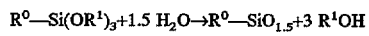

The hydrolysate $R^0$—$SiO_{1.5}$ formed according to this equation precipitates from the reaction mixture as polymeric silicone resin, so that it is no longer available for the desired use. Although organosilanes having a very highly hydrophobic character, such as, for example, alkylalkoxysilanes, especially those having a long or branched carbon skeleton, hydrolyse only very slowly, they are not soluble in water.

The most diverse processes have been suggested in the past to mitigate the known disadvantages described above:

Although some organosilanes, such as, for example, aminoalkylalkoxysilanes, are water-soluble, they have only a weakly hydrophobic character. An improvement in the hydrophobizing action is desirable here. The step of removing the hydrolysis alcohols by distillation during synthesis is known for the preparation of organosilane formulations of water-soluble organosilanes, such as, for example, of 3-aminopropyltriethoxysilane. Water-based aminosilane systems which have a significant alcohol content but are otherwise solvent-free are accessible in this manner and available on the market, for example, in the form of DYNA-SYLAN 1151.

The modification of such water-based organosilane formulations with small amounts of organosilanes which are not water-soluble per se, such as, for example, methyltrimethoxysilane or vinyltrimethoxysilane, is described in a previous European Patent Application which has not yet been published entitled "Method for Preparation of Stable Water-Borne Silane Compositions." A molar ratio of the component which is not water-soluble to the water-soluble component of 1:2.5 can be achieved in this process. The use properties essentially correspond to those of the above-mentioned water-based organosilane formulations. Aqueous solutions having even higher contents of organosilanes which are not water-soluble, for example alkylalkoxysilanes, such as methyl-, propyl-, or isobutyltrimethoxysilane, are not accessible by this process.

In the emulsion method, which likewise belongs to the prior art, the organosilane which is not water-compatible per se on liquid silicone resin which is not water-soluble is emulsified in water with the aid of emulsifiers (EP-A2 0 442 098, EP-B1 0 358 652, U.S. Pat. No. 4,620,878). Disadvantages here are that the products contain noticeable amounts of surfactants as emulsifiers and can liberate considerable amounts of alcohol.

The formulation of silane combinations in water is disclosed in U.S. Pat. No. 5,073,195. The silane formulations are prepared from an alkyltrialkoxysilane which is not water-soluble and a water-soluble silane, such as, for example, an aminoalkylalkoxysilane, in a molar ratio of between 1:2 and 3:1. As can be seen from the examples of U.S. Pat. No. 5,073,195, the formulations are prepared by hydrolysis of the silane mixture in less than the stoichiometric amount and stripping of the reaction mixture at 60° C. under reduced pressure, and for subsequent uses the silane formulations thus-obtained are also diluted with water. However, as a result of the dilution with water, the alkoxy groups which remain from the incomplete hydrolysis are released in the form of the corresponding alcohols. The silane cohydrolysates disclosed in U.S. Pat. No. 5,073,195 thus comprise free alcohols in significant amounts and, furthermore, can liberate further amounts of alcohol by hydrolysis, which adversely influences the use properties of the products.

Thus, there remains a need for solvent-free organosilane compositions which have a low free alcohol content, have a high flashpoint, and liberate essentially no alcohols by hydrolysis upon dilution with water. There also remain a need for a process for preparing such organosilane compositions.

SUMMARY OF THE INVENTION

Accordingly, it is one object of the present invention to provide novel organopolysiloxane-containing compositions.

It is another object of the present invention to provide novel water-based organopolysiloxane-containing compositions.

It is another object of the present invention to provide novel water-based organopolysiloxane-containing compositions which are essentially solvent-free.

It is another object of the present invention to provide novel water-based organopolysiloxane-containing compositions which contain a reduced amount of free alcohol.

It is another object of the present invention to provide novel water-based organopolysiloxane-containing compositions which liberate a reduced amount of alcohol by hydrolysis upon dilution with water.

It is another object of the present invention to provide novel water-based organopolysiloxane-containing compositions which have a high flashpoint.

It is another object of the present invention to provide novel water-based organopolysiloxane-containing compositions which are useful for hydrophobicizing surfaces, for hydrophobicizing mineral building materials, for protecting buildings and facades, for coating glass fibers, for silanizing fillers, for improving the rheological properties of dispersions and emulsions, for hydrophobicizing textiles, leather and cellulose and starch products, as adhesion promoters for improving the adhesion of organic polymers to inorganic surfaces, as release agents, as crosslinking agents, and as additives for paints and varnishes.

It is another object of the present invention to provide a process for preparing such novel water-based organopolysiloxane-containing compositions.

These and other objects, which will become apparent during the following detailed description, have been achieved by the inventors' discovery that such water-based organopolysiloxane-containing compositions may be prepared by mixing aminoalkylalkoxysilanes of the general formula (I) with alkyltrialkoxysilanes and/or dialkyldialkoxysilanes of the general formulae (II) and (III), adding water to the mixture, adjusting the pH of the reaction mixture to a value of between 1 and 8 and removing any alcohol present and/or formed during the reaction. These formulations are essentially free from organic solvents. The compositions of the present invention are surprising, because the organopolysiloxane-containing compositions thus-prepared are clear, stable solutions which have a flashpoint of significantly more than 80° C. and essentially liberate no alcohols by hydrolysis even on dilution with water.

The present invention therefore provides water-based organopolysiloxane-containing compositions which are essentially free from organic solvents, have a flashpoint of more than 80° C. and essentially liberate no alcohols by hydrolysis on dilution with water.

According to current model concepts of monomeric, oligomeric, polymeric and copolymeric condensation products, such products can also be formed in an aqueous system as the result of a hydrolysis reaction of organosilanes which are not water-soluble and water-soluble organosilanes.

DETAILED DESCRIPTION OF THE PREFERRED EMBODIMENTS

The organopolysiloxane-containing compositions according to the present invention can thus comprise, for example, linear cocondensates of the general formula

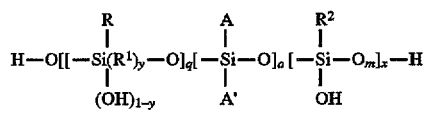

and/or cyclic cocondensates of the general formula

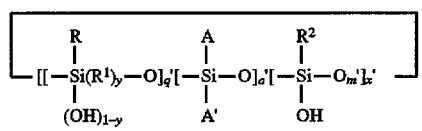

and/or linear condensates of the general formula

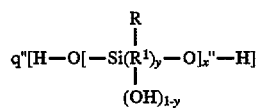

and/or linear condensates of the general formula

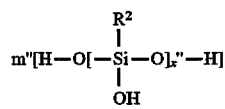

and/or linear condensates of the general formula

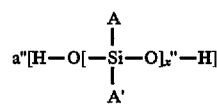

and/or cyclic condensates of the general formula

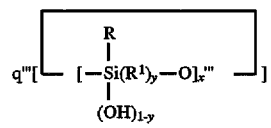

and/or cyclic condensates of the general formula

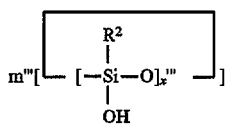

and/or cyclic condensates of the general formula

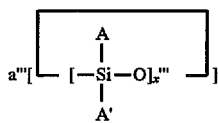

and/or silanols of the general formula

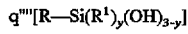

and/or silanols of the general formula

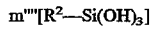

and/or silanols of the general formula

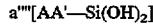

wherein R can be, for example, an amino-functional organic group of the general formula $[Z_{(f+g+h)}]^{(f+g+h)-}[NH_{2+f}(CH_2)_b(NH_{g+1})_c(CH_2)_d(NH_{h+1})_e(CH_2)_i]^{(f+g+h)+}$, in which $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$ then $c=0$, if $d=0$ then $e=0$, if $i=0$ then $e=0$, if $d=i=0$ then $c=0$, and Z can be a monobasic inorganic or organic acid radical, such as, for example, chloride or nitrate or formate or acetate, in which $R^1$ can be, for example, a methyl or ethyl radical, $R^2$ can be, for example, a linear or cyclic or branched alkyl radical having 1 to 8 C atoms, A can be, for example, an unbranched or branched alkyl radical having 1 to 3 C atoms and A' can be, for example, an unbranched or branched alkyl radical having 1 to 3 C atoms, $0 \leq y \leq 1$, x, x', x", x'" and x"" distributed in the polymers can have values greater than 4 and the ratio M/Q can be, for example, between 0 and 2, preferably between 0.1 and 1.5, in which Q can be the sum of $q+q'+q''+q'''+q''''$ and M can be the sum of $m+m'+m''+m'''+m''''+a+a'+a''+a'''+a''''$ and $0<(m+m'+m''+m'''+m'''')/(a+a'+a''+a'''+a'''')<10$.

The present invention furthermore provides water-based organopolysiloxane-containing compositions which are essentially free from organic solvents, have a flashpoint of more than 80° C., and essentially liberate no alcohol by hydrolysis on dilution with water, and which are obtainable by mixing water-soluble aminoalkylalkoxysilanes of the general formula (I)

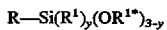

with alkyltrialkoxysilanes which are not water-soluble, of the general formula (II)

and/or dialkyldialkoxysilanes which are not water-soluble, of the general formula (III)

$$AA'—Si(OR^{1***})_2 \qquad (III)$$

and/or mixtures of alkyltrialkoxysilanes and dialkyldialkoxysilanes which are not water-soluble, of the general formulae (II) and (III), wherein R is an amino-functional organic group of the general formula (IV)

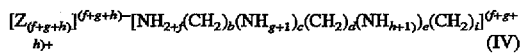

where $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$ then $c=0$, if $d=0$ then $e=0$, if $i=0$ then $e=0$, if $d=i=0$ then $c=0$, and Z can be a monobasic inorganic or organic acid radical, $R^1$, $R^{1*}$, $R^{1}$ and $R^{1*}$ are a methyl or ethyl radical, $R^2$ is a linear or cyclic or branched alkyl radical having 1 to 8 C atoms, A is an unbranched or branched alkyl radical having 1 to 3 C atoms and A' is an unbranched or branched alkyl radical having 1 to 3 C atoms and $0 \leq y \leq 1$ in the molar ratio $0<M/Q \leq 2$, preferably $0.1 \leq M/Q \leq 1.5$, wherein Q is the sum of the numbers of moles of the aminoalkylalkoxysilanes of the general formula (I) and M is the sum of the numbers of moles of the alkyltrialkoxysilanes of the general formula (II) and of the dialkyldialkoxysilanes of the general formula (III);

adding water to the mixture;

adjusting the pH of the reaction mixture to a value of between 1 and 8; and removing any alcohol already present and/or formed during the reaction.

The present invention furthermore provides a process for the preparation of organopolysiloxane-containing compositions which are essentially free from organic solvents, have a flashpoint of more than 80° C., and essentially liberate no alcohol by hydrolysis on dilution with water, and which is characterized in that water-soluble amimoalkylalkoxysilanes of the general formula (I)

$$R—Si(R^1)_y(OR^{1*})_{3-y} \qquad (I)$$

are mixed with alkyltrialkoxysilanes which are not water-soluble, of the general formula (II)

$$R^2—Si(OR^{1**})_3 \qquad (II)$$

and/or dialkyldialkoxysilanes which are not water-soluble, of the general formula (III)

$$AA'—Si(OR^{1***})_2 \qquad (III)$$

and/or mixtures of alkyltrialkoxysilanes and dialkyldialkoxysilanes which are not water-soluble, of the general formulae (II) and (III), wherein R is an amino-functional organic group of the general formula IV

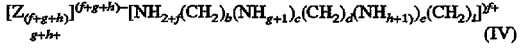

where $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$ then $c=0$, if $d=0$ then $e=0$, if i=0 then e=0, if d=i=0 then c=0, and Z can be a monobasic inorganic or organic acid radical, $R^1$, $R^{1*}$, $R^{1}$ and $R^{1*}$ are a methyl or ethyl radical, $R^2$ is a linear or cyclic or branched alkyl radical having 1 to 8 C atoms, A is an unbranched or branched alkyl radical having 1 to 3 C atoms and A' is an unbranched or branched alkyl radical having 1 to 3 C atoms and $0 \leq y < 1$ in the molar ratio $0 < M/Q \leq 2$, preferably $0.1 \leq M/Q \leq 1.5$, wherein Q is the sum of the numbers of moles of the aminoalkylalkoxysilanes of the general formula (I) and M is the sum of the numbers of moles of the alkyltrialkoxysilanes of the general formula (II) and of the dialkyldialkoxysilanes of the general formula (III);

water is added to the mixture;

the pH of the reaction mixture is adjusted to a value of between 1 and 8; and any alcohol already present and/or formed during the reaction is removed.

Starting components which are not water-soluble and are preferably employed in the process according to the present invention are mixtures of alkyltrialkoxysilanes of the general formula (II) and dialkyldialkoxysilanes of the general formula (III) which are prepared by simultaneous esterification of the corresponding tri- and dichlorosilanes of the general formulae (V) and (VI)

wherein $R^2$ is a linear or cyclic or branched alkyl radical having 1 to 8 C atoms, A is an unbranched or branched alkyl radical having 1 to 3 C atoms and A' is an unbranched or branched alkyl radical having 1 to 3 C atoms, with methanol or ethanol. However, the mixtures per se can also be obtained from the pure individual components, the alkyltrialkoxy- and dialkyldialkoxysilanes of the general formulae (II) and (III), by mixing.

The present invention further provides the preferred use of the present organopolysiloxane-containing compositions for hydrophobizing surfaces, for hydrophobicizing mineral building materials, for protecting buildings and facades, for coating glass fibers, for silanization of fillers, as adhesion promoters, in particular for improving the adhesion of organic polymers to inorganic surfaces, as release agents, for improving rheological properties, in particular of dispersions and emulsions, as crosslinking agents, as an additive to paints and varnishes, and for hydrophobicizing textiles, leather and cellulose and starch products.

The organopolysiloxane-containing compositions according to the present invention are essentially free from organic solvents, but can comprise small amounts of alcohols, in particular methanol and/or ethanol. The alcohol content in the organosiloxane-containing compositions according to the invention is preferably less than 2% by weight, particularly preferably less than 0.5% by weight, and especially preferably less than 0.1% by weight, based on the total weight of the composition.

The organopolysiloxane-containing compositions according to the invention preferably have a pH of between 1 and 8, particularly preferably a pH of between 3 and 6, and especially preferably a pH of between 3 and 5. The present compositions suitably comprise a monobasic inorganic and/or organic acid and/or secondary products thereof. Secondary products here are understood as meaning compounds such as alkali metal halides, in particular sodium chloride or potassium chloride, alkali metal acetates, alkali metal formates, alkali metal nitrates or compounds of the amino groupings in the organopolysiloxanes with inorganic or organic acid radicals, such as can be seen from the general formula (IV).

As a result of an advantageous component measure in the preparation, the organopolysiloxane-containing compositions according to the present invention can comprise a defoamer, preferably a silicone resin suspension.

The process for the preparation of the organosiloxane-containing compositions according to the present invention can be carried out as described in detail below:

Water-soluble organosilanes of the general formula (I) are first mixed with alkyltrialkoxysilanes and/or dialkyldialkoxysilanes which are not water-soluble, of the general formulae (II) and (III), and/or separately prepared mixtures of alkyltrialkoxysilanes and dialkyldialkoxysilanes which are not water-soluble. In general, water is added to the reaction mixture, preferably 0.5 to 10 mole of water, particularly preferably 1 to 5 mole of water, per the sum of the moles of the aminoalkylalkoxysilanes of the general formula (I) employed, of the alkyltrialkoxysilanes of the general formula (II) and/or of the dialkyldialkoxysilanes of the general formula (III). The water can be added in portions with periods of interruption. However, the operation of metering in the water can also be carried out continuously with periods of interruption or the discontinuous and continuous procedures of metering in the water can be combined with one another in a suitable manner. A procedure can also be followed in which one of the above-mentioned organosilane components is initially introduced into the mixing vessel, the water is metered in, the other organosilane components are subsequently added, and water is then subsequently metered in—if still necessary.

Mixtures of alkyltrialkoxysilanes and/or dialkyldialkoxysilanes which are not water-soluble, of the general formulae (II) and (III), are preferably prepared by joint esterification of a mixture of the corresponding alkyltrichlorosilanes of the general formula (V) and dialkyldichlorosilanes of the general formula (VI) with alcohols, preferably methanol or ethanol. The chlorosilane mixture which has been prepared, for example, by mixing alkyltrichlorosilanes and dialkyldichlorosilanes is esterified with an alcohol or also several alcohols in a manner known per se to give a corresponding crude alkylalkoxy-silane mixture. Most of the hydrogen chloride thereby formed is preferably driven out of the crude alkylalkoxysilane mixture. The crude alkylalkoxysilane mixture furthermore can be adjusted to a pH of between 6 and 9, preferably to a pH of between 7 and 8, with an alkali metal alcoholate solution. Suitable alkali metal alcoholate solutions are, for example, sodium methanolate or potassium methanolate and sodium ethanolate or potassium ethanolate based on ethanol or methanol, although other alcoholates and alcohols, such as, for example, n-propanol, i-propanol, n-butanol, sec-butanol, tert-butanol and the alcoholates which can be derived therefrom, can also be employed. The crude alkylalkoxysilane mixture is filtered in a suitable manner. A crude alkylalkoxysilane mixture thus obtained can be employed without further working up for preparation of organopolysiloxane-containing compositions according to the present invention.

In the process according to the present invention, the pH of the reaction mixture comprising, in general, water-soluble organosilanes and organosilanes which are not water-soluble, of the general formulae (I), (II), and (III), is suitably adjusted to a value of between 1 and 8, preferably to a value of between 3 and 6, particularly preferably to a value of between 3 and 5. Metering in of the acid can be carried out together with the metering in of the water described above or also separately. An inorganic or organic acid, preferably a monobasic acid, particularly preferably nitric acid or hydrochloric acid or acetic acid or formic acid, is in general added to the reaction mixture.

The reaction is in general carried out in a temperature range of between 0° and 100° C., preferably in a temperature range of between 10° and 80° C. and particularly preferably between 20° and 60° C.

The reaction is suitably carried out with stirring.

The alcohol already present and/or formed during the reaction is in general removed from the reaction mixture. Preferably, the alcohol already present and/or formed during the reaction is removed by distillation, and during this operation water is simultaneously added at the rate at which the alcohol is removed from the reaction mixture. Removal of the alcohol by distillation is preferably carried out under reduced pressure. Removal of the alcohol by distillation is preferably carried out until a temperature which corresponds to the boiling point of water at the distillation pressure is reached at the top of the column.

The pH in the reaction medium can also be adjusted by addition of an organic or inorganic acid, in particular a monobasic acid, during and/or after removal of the alcohols by distillation.

In the process according to the present invention, the residual content of alcohol in the organopolysiloxane-containing compositions is preferably adjusted to less than 2.0% by weight, particularly preferably to less than 0.5% by weight, especially preferably to less than 0.1% by weight, based on the weight of the composition.

A defoamer, particularly preferably an aqueous silicone resin suspension, is preferably added before and/or during the removal of the alcohol by distillation to prevent foam formation.

Clouding or precipitates sometimes occur in the product during or after the end of the distillation, and these often originate from the defoamer added. To obtain a clear product, the resulting product is suitably after-purified by sedimentation and/or filtration after the removal of the alcohol by distillation. The filtration and the removal of the sediment can be carried out, for example, by a pressure filter, a separator, a decanter, or similar apparatuses.

Products prepared by the process according to the present invention are stable and clear solutions. The organopolysiloxane-containing compositions according to the present invention can be diluted with water in any ratio, essentially form no hydrolysis alcohols on addition of water, have a flashpoint above 80° C., preferably above 95° C., particularly preferably above 98° C., and are essentially free from organic solvents and surfactants as emulsifiers.

The products according to the present invention and products prepared according to the present invention are used with outstanding advantages over products of the relevant prior art, as is demonstrated by the following examples.

Other features of the invention will become apparent in the course of the following descriptions of exemplary embodiments which are given for illustration of the invention and are not intended to be limiting thereof.

EXAMPLES

Description of the reaction apparatus (applicable to all examples):

Esterification apparatus: 0.5 l laboratory stirred reactor, temperature-controllable (internal temperature measurement), liquid metering device, reflux condenser (intensive condenser with subsequent deep freezer down to −40° C.), nitrogen blanket, laboratory pressure filter.

Hydrolysis apparatus: laboratory stirred tank reactor of 2 l capacity, temperature-controllable, internal temperature measurement, liquid metering device, distillation bridge with top temperature measurement, product condenser, distillate receiving container; laboratory pressure filter (2 l capacity).

The following process parameters apply to all the examples:

Foaming problems during the distillation can be prevented by adding a few drops of a commercially available defoamer based on aqueous silicone resin emulsions to the reaction solution. The slight clouding resulting from the addition of defoamer can be removed by filtration over a pressure filter using a glass fibre filter (pore width<1 μm).

The products obtained in the examples all have the following properties:

The product is clear to slightly opalescent and miscible with water in all proportions. The content of alcohols (sum of free alcohols and hydrolyzable alcohols) is less than 0.5% by weight. The flashpoint of the siloxane solution is above >95° C. and does not fall on dilution with water since no alcohols are formed by hydrolysis.

Description of the test methods for the application investigations:

The reduction in the absorption of water and the penetration depth of the hydrophobized test specimens were determined.

Test specimens of lime sand brick and brick and mortar were immersed completely in the organopolysiloxane formulations for this purpose. After an immersion time of 60 seconds in each case, the test specimens were removed and exposed to air on all sides, and were stored for 2 weeks at an atmospheric humidity of more than 60% relative humidity.

Determination of the absorption of water:

To determine the absorption of water, the treated test specimens and two untreated test specimens which had been stored beforehand under room conditions were each weighed and stored under water. For this, the treated and untreated test specimens were introduced separately into troughs filled with tap water. The water level above the test specimens was about 4 cm.

After 24 hours, the absorption of water by the test specimens was determined by differential weighing. The reduction in the absorption of water by the hydrophobized test specimens in each case relates to the mean value of the absorption of water by the non-hydrophobized comparison samples.

The penetration depth was then determined.

Determination of the penetration depth:

To determine the penetration depth, the treated test specimens were divided into two parts, and the fresh broken surfaces were each dipped in water. The layer hydrophobized by the impregnating agent is not wetted by the water during this operation, and contrasts clearly with the dark-colored region which has not been hydrophobized and therefore has been wetted by water. The layer thickness of the hydrophobic layer was measured.

Example 1

Preparation of a water-soluble cohydrolysate of aminopropyltriethoxysilane (AMEO), propyltrichlorosilane (PTCS) and dimethyldichlorosilane (DMDCS):

38.7 g of DMDCS and 53.3 g of PTCS are initially introduced into the esterification apparatus described above.

50.4 g of methanol are metered in over a period of 2 hours, while stirring. The bottom temperature during this operation is about 60° C. Thereafter, HCl is driven off under reflux for 2 hours. To bring the esterification reaction to completion, a 30% strength by weight sodium methylate solution (about 39 g) is added to the crude product which still contains chlorosilane until the ester crude product has a pH of 7 to 8. After filtration, the mixture is transferred to the hydrolysis apparatus, and 132.6 g of AMEO, 64.8 g of water, and 29.5 g of formic acid are added in succession in the course of about 20 minutes. The reaction is exothermic, the temperature rises to about 60° C., and the solution has a pH of about 4 to 5. The hydrolysis alcohols formed are then distilled off in the course of about 4 hours at a bottom temperature of 55° C. under a pressure which falls from 292 mbar to 130 mbar, water being metered in during the distillation at the rate (based on the weight) at which the distillate is removed (about 350 g). Thereafter, the product is diluted with 713 g of water to the ready-to-use final concentration.

Example 2

Preparation of a water-soluble cohydrolysate of aminopropyltriethoxysilane (AMEO), propyltrichlorosilane (PTCS), isobutyltrichlorosilane (IBTCS), octyltrichlorosilane (OCTCS) and dimethyldichlorosilane (DMDCS):

38.7 g of DMDCS, 53.3 g of PTCS, 57.5 g of IBTCS, and 14.9 g of OCTCS are initially introduced into the esterification apparatus described above. 86.7 g of methanol are metered in over a period of 2 hours, while stirring. The bottom temperature during this operation is about 60° C. Thereafter, HCl is driven off under reflux for 2 hours. To bring the esterification reaction to completion, a 30% strength by weight sodium methylate solution (about 60 g) is added to the crude product which still contains chlorosilane until the ester crude product has a pH of 7 to 8. After filtration, the mixture is transferred to the hydrolysis apparatus, and 132.6 g of AMEO, 84.2 g of water, and 29.0 g of formic acid are added in succession in the course of about 20 minutes. The reaction is exothermic, the temperature rises to about 60° C., and the solution has a pH of about 4 to 5. The hydrolysis alcohols formed are then distilled off in the course of about 4 hours at a bottom temperature of 55° C. under a pressure which falls from 292 mbar to 130 mbar, water being metered in during the distillation at the rate at which the distillate is removed (about 350 g). Thereafter, the product is diluted with 1032 g of water to the ready-to-use final concentration.

Example 3

Preparation of a water-soluble cohydrolysate of aminopropyltriethoxysilane (AMEO), propyltrichlorosilane (PTCS), propylmethyldichlorosilane (PMDCS) and dimethyldichlorosilane (DMDCS):

38.7 g of DMDCS, 106.5 g of PTCS, and 47.1 g of PMDCS are initially introduced into the esterification apparatus described above. 101 g of methanol are metered in over a period of 2 hours, while stirring. The bottom temperature during this operation is about 60° C. Thereafter, HCl is driven off under reflux for 2 hours. To bring the esterification reaction to completion, a 30% strength by weight sodium methylate solution (about 35 g) is added to the crude product which still contains chlorosilane until the ester crude product has a pH of 7 to 8. After filtration, the mixture is transferred to the hydrolysis apparatus, and 265.2 g of AMEO, 130 g of water, and 55 g of formic acid are added in succession in the course of about 20 minutes. The reaction is exothermic, the temperature rises to about 60° C., and the solution has a pH of about 4 to 5. The hydrolysis alcohols formed are then distilled off in the course of about 4 hours at a bottom temperature of 55° C. under a pressure which falls from 292 mbar to 130 mbar, water being metered in during the distillation at the rate at which the distillate is removed (about 330 g). Thereafter, the product is diluted with 1750 g of water to the ready-to-use final concentration.

Example 4

Improvement of the foaming properties of the product from Example 1

In each case 100 ml of the product from Example 1 are introduced into two similar bottles of 250 ml capacity. 10 mg of a defoamer based on silicone resin is added to one of the solutions, while stirring. Both bottles are closed and shaken vigorously. It is found that the two solutions foam severely. However, while the foam of the non-modified solution is stable for more than 5 minutes, the foam of the solution to which defoamer has been added collapses after a few seconds.

Example 5

Application test on the product from Example 1

The results of the application investigations on the product from Example 1 on building materials are presented in Table 1 and compared with those of the comparison experiment. The results show that the product from Example 1 causes a significantly lower absorption of water, i.e. a significantly improved hydrophobicizing, than the product from the comparison example. Furthermore, products from Example 1 are capable of penetrating more deeply into lime sand and mortar.

Comparison Example 1

Preparation of a water-soluble cohydrolysate of AMEO and propyltrimethoxysilane (PTMO) in the molar ratio 1:1

221 g of AMEO and 164 g of PTMO are mixed in the hydrolysis apparatus described above, and 54 g of water are added. After half an hour, a further 126 g of water are added in the course of 15 minutes via the metering device, while stirring. During this operation, the temperature rises from 20° C. to about 57° C. 114 g of HCl (32% strength by weight in water) are metered in by way of the metering device in the course of a further 15 minutes, while stirring. An ethanol/methanol/water mixture is distilled off at a bottom temperature of up to 102° C. under normal pressure in the course of about 4 hours, until the top temperature is about 100° C. and the top product comprises only water. During the distillation, water is fed to the product via the metering device at a rate which corresponds in amount to the amount of distillate removed.

Comparison Example 2

Application test on the product from Comparison Example 1

The results of the application investigations on the products from Example 1 and Comparison Example 1 are compared in Table I and commented on in Example 5.

Table 1

Comparison of the products from Example 1 and Comparison Example 1 with the aid of application tests Application test on the product from Example 1:

| Building material | Immersion time (sec.) | Reduction in absorption of H$_2$O (%) | Penetration depth (mm) |
|---|---|---|---|
| Lime sand brick | 60 | 95 | 2 |
| Brick | 60 | 92 | >25 |
| Mortar | 60 | 88 | 10 |

Application test on the product from Comparison Example 1:

| Building material | Immersion time (sec.) | Reduction in absorption of H$_2$O (%) | Penetration depth (mm) |
|---|---|---|---|
| Lime sand brick | 60 | 80 | 1 |
| Brick | 60 | 14 | >25 |
| Mortar | 60 | 80 | 2 |

The present application is based on German Patent Application P 44 43 825.7 filed on Dec. 9, 1994, which is incorporated herein by reference in its entirety.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A water-based organopolysiloxane-containing composition, which is essentially free from organic solvents, has a flashpoint of more than 80° C., and essentially liberates no alcohols by hydrolysis on dilution with water, obtained by:

(i) mixing a water-soluble aminoalkylalkoxysilane of the formula (I)

$$R-Si(R^1)_y(OR^{1*})_{3-y} \quad (I)$$

with a dialkyldialkoxysilane which is not water-soluble, of the formula (III)

$$AA'-Si(OR^{1***})_2 \quad (III)$$

or with a mixture of an alkyltrialkoxysilane which is not water-soluble, of the formula (II)

$$R^2-Si(OR^{1**})_3 \quad (II)$$

and a dialkyldialkoxysilane which is not water-soluble, of the formula (III),
   wherein R is an amino-functional organic group of the formula (IV)

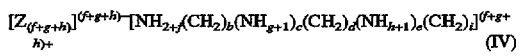

$$[Z_{(f+g+h)}]^{(f+g+h)-}[NH_{2+f}(CH_2)_b(NH_{g+1})_c(CH_2)_d(NH_{h+1})_e(CH_2)_i]^{(f+g+h)+} \quad (IV)$$

where $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$ then $c=0$, if $d=0$ then $e=0$, if $i=0$ then $e=0$, if $d=i=0$ then $c=0$, and Z can be a monobasic inorganic or organic acid radical, $R^1$, $R^{1*}$, $R^{1}$ and $R^{1*}$ are a methyl or ethyl radical, $R^2$ is a linear or cyclic or branched alkyl radical having 1 to 8 C atoms, A is an unbranched or branched alkyl radical having 1 to 3 C atoms and A' is an unbranched or branched alkyl radical having 1 to 3 C atoms and $0 \leq y \leq 1$, in the molar ratio $0 < M/Q \leq 2$, (i) wherein Q is the sum of the numbers of moles of the aminoalkylalkoxysilanes of the formula (I) and M is the sum of the numbers of moles of the alkyltrialkoxysilanes of the formula (II) and of the dialkyldialkoxysilanes of the formula (III);

(ii) adding water to the mixture;

(iii) adjusting the pH of the reaction mixture to a value of between 1 and 8; and (iv) removing any alcohol already present and/or formed during the reaction.

2. The organopolysiloxane-containing composition of claim 1, having a pH of between 1 and 8.

3. The organopolysiloxane-containing composition of claim 1, comprising a monobasic inorganic and/or organic acid and/or secondary product thereof.

4. The organopolysiloxane-containing composition of claim 1, having an alcohol content of less than 2% by weight.

5. The organopolysiloxane-containing composition of claim 1, comprising a silicone resin suspension.

6. A process for the preparation of an organopolysiloxane-containing composition according to claim 1, comprising:

(i) mixing a water-soluble aminoalkylalkoxysilane of the formula (I)

$$R-Si(R^1)_y(OR^{1*})_{3-y} \quad (I)$$

with a dialkyldialkoxysilane which is not water-soluble, of the formula (III)

$$AA'-Si(OR^{1***})_2 \quad (III)$$

or with a mixture of an alkyltrialkoxysilane which is not water-soluble, of the formula (II)

$$R^2-Si(OR^{1**})_3 \quad (II)$$

and a dialkyldialkoxysilane which is not water-soluble, of the formula (III),
   wherein R is an amino-functional organic group of the formula (IV)

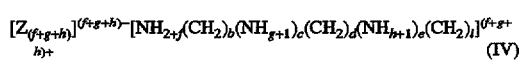

$$[Z_{(f+g+h)}]^{(f+g+h)-}[NH_{2+f}(CH_2)_b(NH_{g+1})_c(CH_2)_d(NH_{h+1})_e(CH_2)_i]^{(f+g+h)+} \quad (IV)$$

where $0 \leq b \leq 3$, $0 \leq d \leq 3$, $0 \leq i \leq 3$, $0 \leq f \leq 1$, $0 \leq g \leq 1$, $0 \leq h \leq 1$, $0 \leq c \leq 1$, $0 \leq e \leq 1$, $b+d+i \neq 0$, if $b=0$ then $c=0$, if $d=0$ then $e=0$, if $i=0$ then $e=0$, if $d=i=0$ then $c=0$, and Z can be a monobasic inorganic or organic acid radical, $R^1$, $R^{1*}$, $R^{1}$ and $R^{1*}$ are a methyl or ethyl radical, $R^2$ is a linear or cyclic or branched alkyl radical having 1 to 8 C atoms, A is an unbranched or branched alkyl radical having 1 to 3 C atoms and A' is an unbranched or branched alkyl radical having 1 to 3 C atoms and $0 \leq y \leq 1$, in the molar ratio $0 < M/Q \leq 2$, (i) wherein Q is the sum of the numbers of moles of the aminoalkylalkoxysilanes of the formula (I) and M is the sum of the numbers of moles of the alkyltrialkoxysilanes of the formula (II) and of the dialkyldialkoxysilanes of the formula (III) to obtain a reaction mixture;

(ii) adding water to said reaction mixture;

(iii) adjusting the pH of said reaction mixture to a value of between 1 and 8; and (iv) removing any alcohol already present and/or formed during said reaction.

7. The process of claim 6, wherein said mixture of an alkyltrialkoxysilanes of the formula (II) and a dialkyldialkoxysilanes of the formula (III) is prepared by simultaneous esterification of tri- and dichlorosilanes of the formulae (V) and (VI)

$$R^2\text{—}SiCl_3 \qquad (V)$$

$$AA'\text{—}SiCl_2 \qquad (VI)$$

wherein $R^2$ is a linear or cyclic or branched alkyl radical having 1 to 8 C atoms, A is an unbranched or branched alkyl radical having 1 to 3 C atoms and A' is an unbranched or branched alkyl radical having 1 to 3 C atoms, with methanol or ethanol.

8. The process of claim 6, wherein 0.5 to 10 mole of water per the sum of the moles of said aminoalkylalkoxysilane of the formula (I), said alkyltrialkoxysilane of the formula (II) and/or said dialkyldialkoxysilane of the formula (III) are added to said reaction mixture.

9. The process of claim 6, wherein a monobasic acid is added to said reaction mixture.

10. The process of claim 6, wherein said reaction is carried out in a temperature range between 0° and 100° C.

11. The process of claim 6, wherein any alcohol already present and/or formed during said reaction is removed by distillation, and during said distillation water is simultaneously added at the rate at which the alcohol is removed from the reaction medium.

12. The process of claim 11, wherein said removal of alcohol by distillation is carried out under reduced pressure.

13. The process of claim 11, wherein said removal of alcohol by distillation is carried out until a temperature which corresponds to the boiling point of water is reached in the top of the column.

14. The process of claim 11, wherein a defoamer is added before and/or during the removal of alcohol by distillation.

15. The process of claim 11, wherein the resulting product is after-purified by sedimentation and/or filtration after the removal of alcohol by distillation.

16. The process of claim 6, wherein the residual content of alcohol in said organopolysiloxane-containing composition is adjusted to <2% by weight.

17. A method of hydrophobicizing a substrate, comprising contacting said substrate with a water-based organopolysiloxane-containing composition of claim 1.

18. The method of claim 17, wherein said substrate is selected from the group consisting of textiles, leather, cellulose, starch products, and mineral building materials.

19. The method of claim 17, wherein said substrate is a building.

20. A method for improving the rheological properties of a dispersion or emulsion, comprising adding a water-based organopolysiloxane-containing composition of claim 1 to said dispersion or emulsion.

21. The method of claim 20, wherein said dispersion or emulsion is a paint or varnish.

22. A method for modifying the surface properties of a substrate, comprising contacting said substrate with a water-based organopolysiloxane-containing composition of claim 1.

23. The method of claim 22, wherein said substrate is a glass fiber, an inorganic filler, or an organic polymer.

* * * * *